(12) United States Patent
Tardiff et al.

(10) Patent No.: US 8,534,607 B2
(45) Date of Patent: Sep. 17, 2013

(54) MULTIPLE BUNDLE SLING LOAD SYSTEM

(75) Inventors: Marc Tardiff, Chelmsford, MA (US); George N. Moorachian, Jr., Watertown, MA (US); Todd Grenga, Cumberland, RI (US); William S. Ricci, Needham, MA (US); Richard John Benney, Stow, MA (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 162 days.

(21) Appl. No.: 13/288,411

(22) Filed: Nov. 3, 2011

(65) Prior Publication Data

US 2013/0112813 A1    May 9, 2013

(51) Int. Cl.
*B64D 1/12* (2006.01)
(52) U.S. Cl.
USPC ............. 244/137.4; 244/137.3; 244/137.1
(58) Field of Classification Search
USPC ........ 244/137.3, 137.4, 137.1, 17.11; 212/71
See application file for complete search history.

(56) References Cited

U.S. PATENT DOCUMENTS

| | | | | |
|---|---|---|---|---|
| 3,044,818 A * | 7/1962 | Tobey | | 244/118.1 |
| 3,120,403 A * | 2/1964 | Molzan et al. | | 294/74 |
| 3,904,156 A * | 9/1975 | Smith | | 244/118.1 |
| 3,946,971 A * | 3/1976 | Chadwick | | 244/137.4 |
| 4,575,028 A * | 3/1986 | Dean et al. | | 244/137.4 |
| 4,826,109 A * | 5/1989 | Camus | | 244/137.4 |
| 4,881,601 A * | 11/1989 | Smith | | 169/53 |
| 5,039,036 A * | 8/1991 | Rogers | | 244/138 R |
| 5,465,925 A * | 11/1995 | Connolly et al. | | 244/137.1 |
| 5,499,785 A * | 3/1996 | Roberts et al. | | 244/137.4 |
| 5,593,113 A * | 1/1997 | Cox | | 244/137.1 |
| 5,836,548 A * | 11/1998 | Dietz et al. | | 244/137.1 |
| 6,189,834 B1 * | 2/2001 | Dietz et al. | | 244/137.1 |
| 2002/0166925 A1 * | 11/2002 | Benney et al. | | 244/142 |
| 2003/0038215 A1 * | 2/2003 | Benney et al. | | 244/145 |
| 2007/0200032 A1 * | 8/2007 | Eadie et al. | | 244/137.4 |
| 2009/0014583 A1 * | 1/2009 | Shelton | | 244/118.2 |
| 2009/0146010 A1 * | 6/2009 | Cohen | | 244/137.1 |
| 2010/0001139 A1 * | 1/2010 | Humbert et al. | | 244/137.4 |
| 2012/0037759 A1 * | 2/2012 | Vorwald et al. | | 244/137.4 |
| 2012/0228432 A1 * | 9/2012 | Fox, Jr. | | 244/137.3 |

OTHER PUBLICATIONS

Memorandum "Quick Look Results of Airdrop from the KAMAN Aerospace K-MAX Helicopter"; Marc Tardiff, Apr. 23, 2010.
"Helicopter Sling Load (HSL) of Joint Precision Air Drop Systems (JPADS) Phase I" White Paper by Marc Tardiff, Apr. 28, 2009.
Ultranscom Research & Development Proposal: "Helicopter Sling Load (HSL) of Joint Precision Air Drop systems (JPADS)"; Marc Tardiff, Jul. 30, 2009.
FM 4-20.103; "Airdrop of Supplies and Equipment: Rigging LCLA Resupply Loads"; 2005.

* cited by examiner

*Primary Examiner* — Christopher P Ellis
*Assistant Examiner* — Medhat Badawi
(74) *Attorney, Agent, or Firm* — Roger C. Phillips

(57) ABSTRACT

A multiple bundle sling load system including a sling for attachment to an aircraft, a support system suspended from the sling for carrying a plurality of bundles, a load release mechanism interconnecting each bundle with the support structure, a parachute associated with at least one of the bundles, a parachute release mechanism interconnecting each parachute with the support structure. And an actuator for remotely operating each release mechanism for selectively releasing each load release mechanism and not releasing the associated parachute release mechanism for an air drop operation and selectively releasing each load release mechanism and each associated parachute release mechanism for a land drop operation.

5 Claims, 4 Drawing Sheets

MULTIPLE BUNDLE SLING LOAD SYSTEM

FIELD OF THE INVENTION

This invention relates to an improved, multiple bundle sling load system.

BACKGROUND OF THE INVENTION

Helicopters are used to make land/release of payloads of varying sizes and shapes. Typically, the helicopter carries a sling including, for example, a cable with a hook at one end to attach to a sling load. The sling load can then be externally transported from one location to another.

Sling loads allow even large, bulky cargos such as vehicles to be ferried by the helicopters. To eliminate the need to make numerous trips to ferry a number of payloads or bundles, multiple payload or multiple bundle sling load systems are used. A receiving party can attach a hook or remove a hook from the bundle while it is on the ground. To remove a bundle or payload, either the helicopter must land or the load must be lowered to the ground and manually removed form its hook. In another approach, a multiple bundle sling load system is provided with an automatic release mechanism so that any one or more of the cargo bundles can be released remotely without need for the presence of recovery personnel and the commensurate delay. See U.S. Pat. No. 5,593,113. A further goal is to service multiple payload systems where the individual bundles may be rigged for air drop and then released at altitude to be delivered to the ground under a canopy without preventing the chance for other loads to be delivered via standard sling load delivery.

SUMMARY OF THE INVENTION

It is therefore an object of this invention to provide an improved multiple bundle sling load system.

It is a further object of this invention to provide such an improved multiple bundle sling load system for selectively releasing bundles for air drops and/or land/release.

It is a further object of this invention to provide such an improved multiple bundle sling load system for selectively releasing bundles for air drops and/or land/release and releasing parachute static lines for land/release only.

The invention results from the realization that a multiple bundle sling load system for selectively air dropping and/or land/release a number of bundles can be achieved with a sling for attachment to an aircraft; a support structure suspended from said sling for carrying a plurality of bundles; a load release mechanism interconnecting each bundle with said support structure; a parachute associated with at least one of said bundles; a parachute release mechanism interconnecting each said parachute with said support structure; and an actuator for remotely operating each said release mechanism for selectively releasing each said load release mechanism and not releasing the associated said parachute release mechanism for an air drop operation and selectively releasing each said load release mechanism and each associated said parachute release mechanism for a land drop operation.

The subject invention, however, in other embodiments, need not achieve all these objectives and the claims hereof should not be limited to structures or methods capable of achieving these objectives.

This invention features a multiple bundle sling load system including a sling for attachment to an aircraft, a support system suspended from the sling for carrying a plurality of bundles, a load release mechanism interconnecting each bundle with the support structure, a parachute associated with at least one of the bundles, a parachute release mechanism interconnecting each parachute with the support structure. An actuator remotely operates each release mechanism for selectively releasing each load release mechanism and not releasing the associated parachute release mechanism for an air drop operation and selectively releasing each load release mechanism and each associated parachute release mechanism for a land drop operation.

In a preferred embodiment the sling may include a cable and hook. The support structure may include a number of stations for supporting the bundles. The load release mechanism may include an electrically operated load release device. The parachute release mechanism may include an electrically operated parachute release device and the static line.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
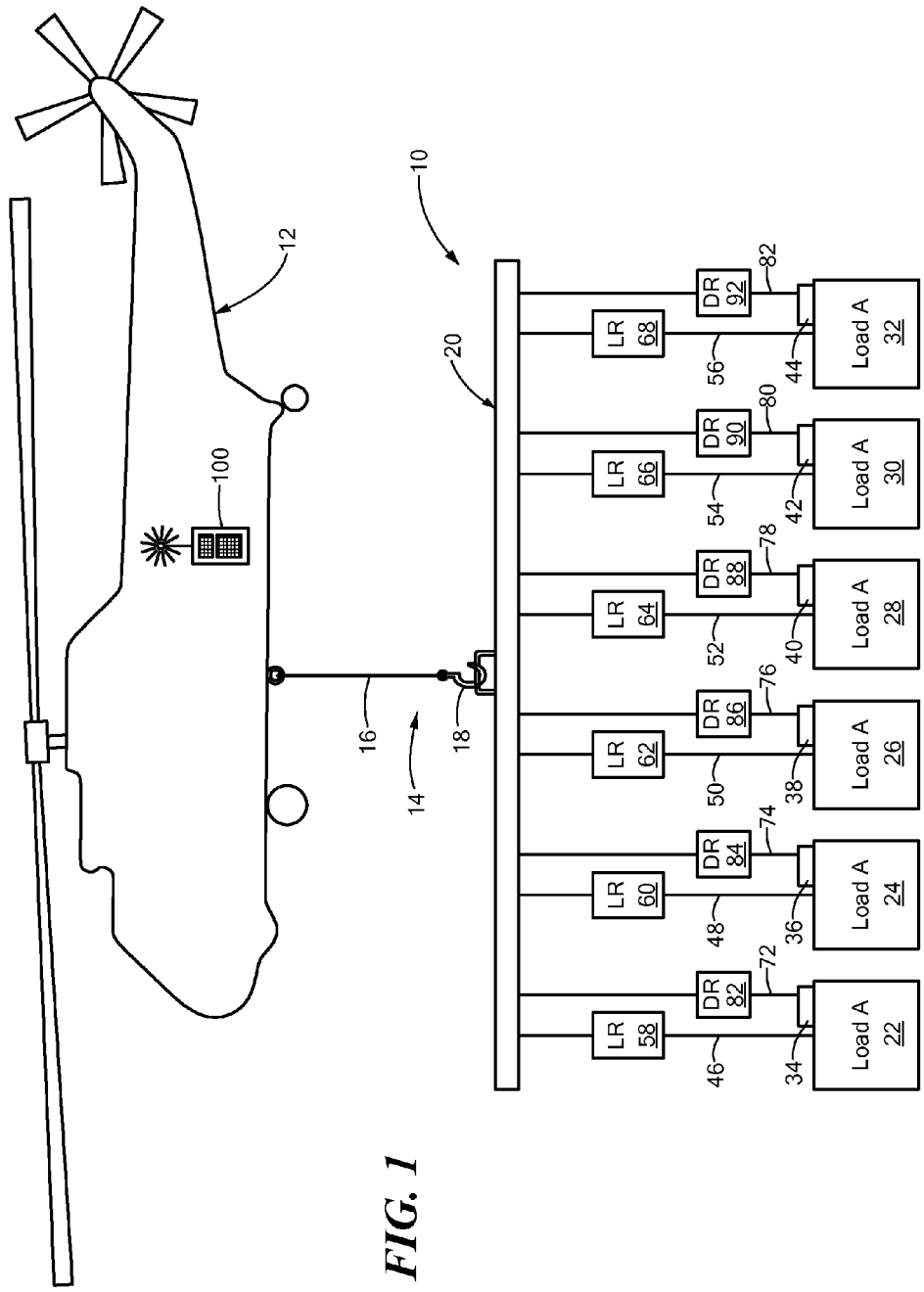
FIG. 1 is a diagrammatic view of a helicopter carrying a multiple bundle sling load system according to this invention with an R.F. remote control.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

There is shown in FIG. 1 a multiple bundle sling system 10 carried by helicopter 12. Sling load system 10 includes a sling or sling system 14, such as a cable 16 and hook 18 attached to support structure 20 which carries an unspecified number of loads, load A-load N, 22, 24, 26, 28, 30 and 32. Each load has associated with it a parachute 34, 36, 38, 40, 42 and 44, respectively. Each load is also attached to support structure 20 by, for example, a suspension sling 46, 48, 50, 52, 54 and 56 in series with a load release mechanism 58, 60, 62, 64, 66 and 68. Each parachute also has associated with it a static line 70, 72, 74, 76, 78 and 80. Along with a parachute release 82, 84, 86, 88, 90 and 92. Each of the release mechanisms 58-68 and 82-92 are individually, separately, addressable by remote controller 100 which is typically carried by personnel aboard helicopter 12.

Using controller 100, any one or more of the releases 58-68 and 82-92 can be actuated to release the associated load 22-32. If the drop is an air drop the parachute release mechanisms 82-92 are not actuated and the static lines are effective to release the parachute as the loads 22-32 drop to the ground. If, on the other hand, any one or more of the loads are to be land dropped the selected ones of the release mechanisms 58-68 will be released and the associated parachute release 82-92 will be released as well to prevent the static line from operating the chute.

Figure 2:
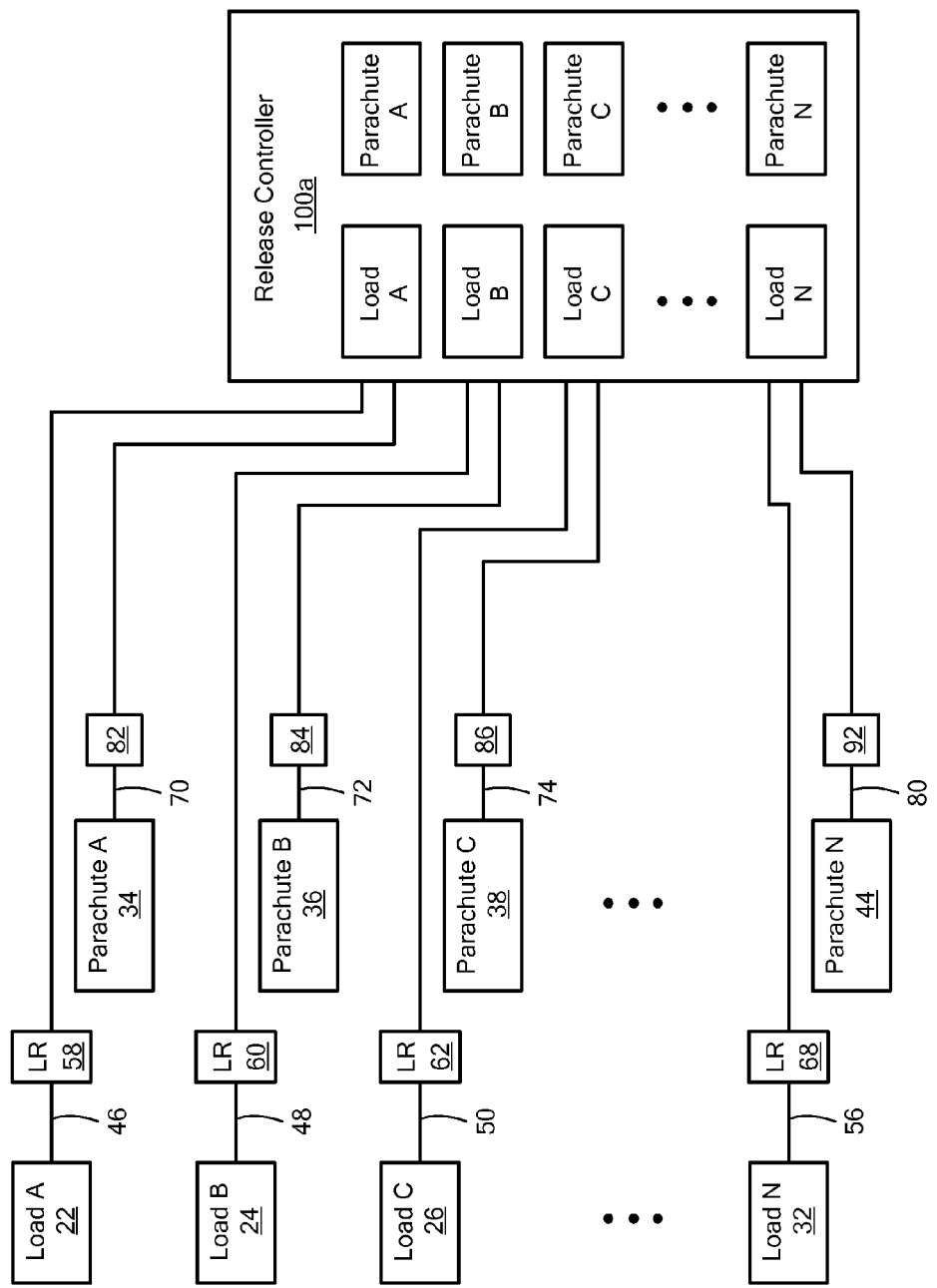
FIG. 2 is a schematic diagram of the system of FIG. 1 with a wired remote controller.

While remote controller 100 is shown as an RF device for communicating with its associated release mechanisms, this is not a necessary limitation of the invention as it may be a wired controller 100a, FIG. 2, in which it is wired directly to the release mechanisms 58-68 of loads A-N, 22-32, and directly to each of parachute release mechanisms 82-92 interconnected with the static lines 70-80 of parachutes 82-92. The separate control of the operation of the release of the loads and their associated parachutes provides the operator with complete freedom to select which one or more loads to drop and whether to execute a land drop and operate the parachute release to prevent the parachute deployment or execute an air drop and release the one or more selected loads but not their related parachute releases so that the parachutes do deploy, or to deliver some by air drop and some by land/release.

Figure 3:
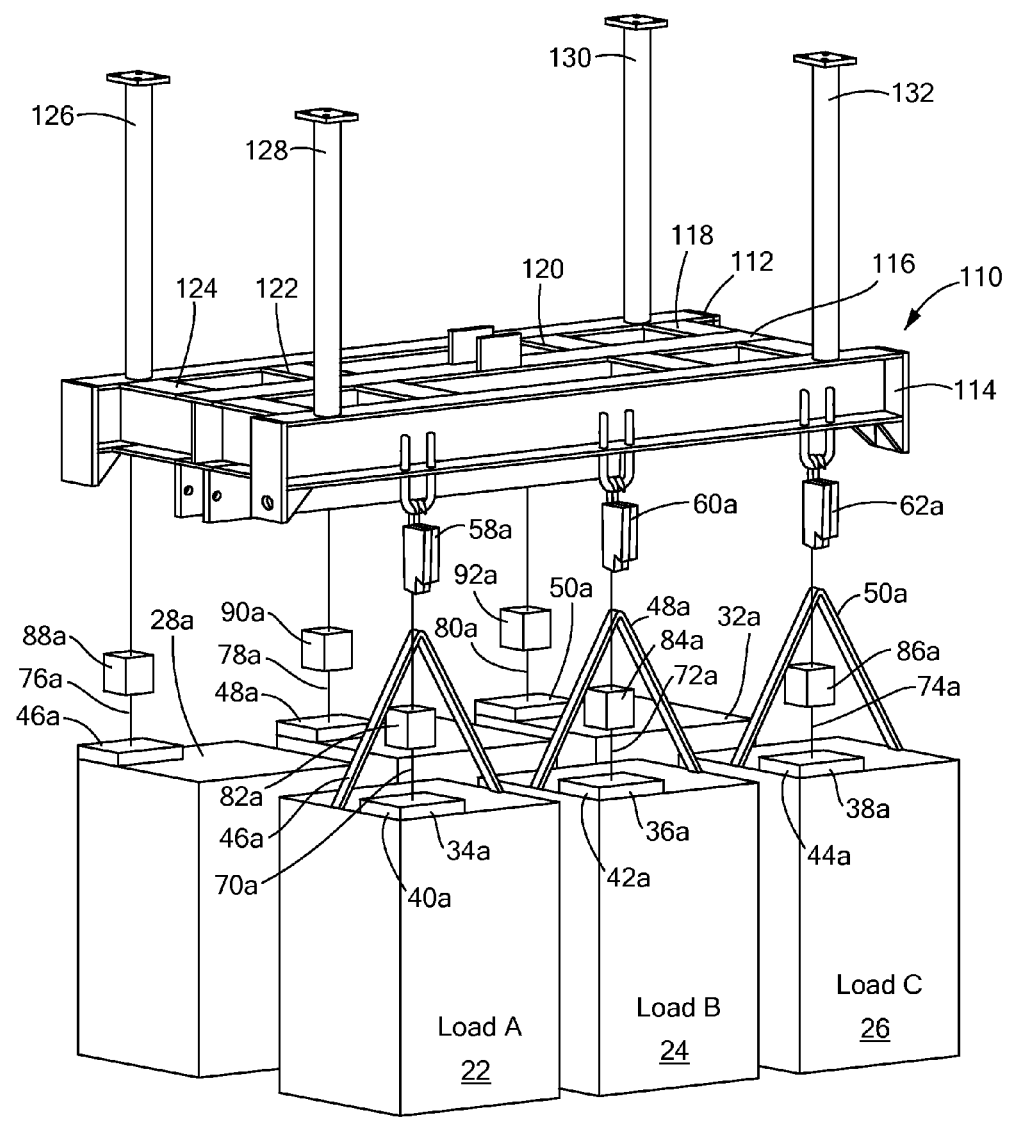
FIG. 3 is a three dimensional, more detailed view of the support structure of FIG. 1 with bundles, parachutes and release mechanisms.

A support structure, FIG. 3, usable with this invention may actually include a frame 110 made of a series of longitudinal beams 112, 114, a center reinforcing beam 116 and a number of cross beams 118, 120, 122 and 124. Suspended from support 110 are the load release mechanisms 58a, 60a, 62a, which grip straps 46a, 48a and 50a of loads A, B and C 22, 24 and 26. Similar release mechanisms and support straps are provided for loads D, E and N 28a, 30a, and 32a whose support straps are not shown. Shown are parachutes 40a, 42a, 44a, 46a, 48a and 50a and their associated static lines 70a, 72a, 74a, 76a, and 78a, and parachute release mechanisms 82a, 84a, 86a, 88a, 90a and 92a.

Figure 4:
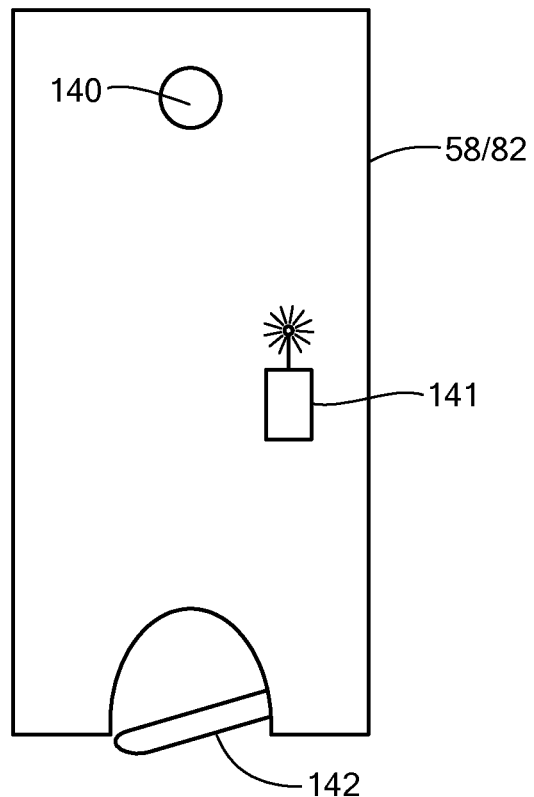
FIG. 4 is a more detailed view of the electrical release mechanism of FIG. 3.

Representative release mechanisms 58 and 82, FIG. 4, are secured to suspension sling 46 by the mounting location 140 and the payload is attached by latch assembly 142. A signal from the aircraft 12 is sent via the wireless activation device 100 to the release mechanisms 58 and 82 causing a release of payload 22.

Figure 5:
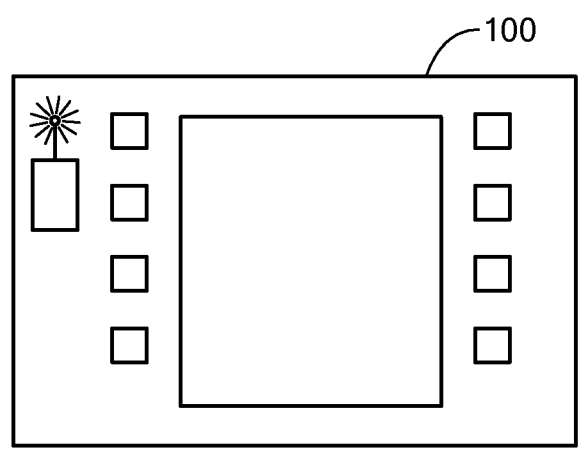
FIG. 5 is a more detailed view of the remote controller of FIG. 2.

Control unit 100, FIG. 5, is a remote device that is used for triggering release 58 and 82. The remote device has different buttons associated with each of the unspecified number of loads. The control device 100 transmits a signal to the specified release mechanism and initiates the release sequence of the payload.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A multiple bundle sling load system comprising:
   a sling for attachment to an aircraft;
   a support system suspended from said sling for carrying a plurality of bundles;
   a load release mechanism interconnecting each bundle with said support structure;
   a parachute associated with at least one of said bundles;
   a parachute release mechanism interconnecting each said parachute with said support structure; and
   an actuator for remotely operating each said release mechanism for selectively releasing each said load release mechanism and not releasing the associated said parachute release mechanism for an air drop operation and selectively releasing each said load release mechanism and each associated said parachute release mechanism for a land drop operation.

2. The sling load system of claim 1 in which said sling includes a cable and hook.

3. The sling load system of claim 1 in which said support structure includes a number of stations for supporting the bundles.

4. The sling load system of claim 1 in which said load release mechanism includes an electrically operated load release device.

5. The sling load system of claim 1 in which said parachute release mechanism includes an electrically operated parachute release device and the static line.

\* \* \* \* \*